(12) United States Patent
Liang et al.

(10) Patent No.: US 11,307,112 B2
(45) Date of Patent: Apr. 19, 2022

(54) SIMPLY-SUPPORTED FIXTURE USED FOR CIRCULAR PLATE IN DYNAMICS OR STATICS EXPERIMENT

(71) Applicant: QINGDAO UNIVERSITY OF TECHNOLOGY, Shandong (CN)

(72) Inventors: Sen Liang, Qingdao (CN); Guanghe Wang, Qingdao (CN); Yunpeng Yan, Qingdao (CN); Gongxian Yang, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 111 days.

(21) Appl. No.: 16/988,307

(22) Filed: Aug. 7, 2020

(65) Prior Publication Data
US 2021/0041319 A1 Feb. 11, 2021

(30) Foreign Application Priority Data

Aug. 7, 2019 (CN) .......................... 2019107274912

(51) Int. Cl.
*G01M 1/02* (2006.01)
(52) U.S. Cl.
CPC ..................................... *G01M 1/02* (2013.01)
(58) Field of Classification Search
CPC .... G01M 1/02; G01N 3/04; G01N 2203/0282
See application file for complete search history.

(56) References Cited

U.S. PATENT DOCUMENTS

| | | | | |
|---|---|---|---|---|
| 4,499,758 A | * | 2/1985 | David ................... | G01N 33/207 73/159 |
| 4,763,521 A | * | 8/1988 | Goodwin ................ | B23K 31/12 228/103 |
| 5,801,311 A | * | 9/1998 | Duell ...................... | G01M 7/08 360/77.02 |
| 5,923,180 A | * | 7/1999 | Botka ................. | G01R 31/2887 324/756.01 |
| 10,408,723 B2 | * | 9/2019 | Krasnowski ............. | G01N 3/24 |
| 2013/0199304 A1 | * | 8/2013 | Hanswillemenke ..... | G01N 3/04 73/818 |
| 2015/0362415 A1 | * | 12/2015 | Sanui ....................... | G01N 3/08 73/821 |

FOREIGN PATENT DOCUMENTS

CN 201130086 Y * 10/2008

* cited by examiner

*Primary Examiner* — Natalie Huls
(74) *Attorney, Agent, or Firm* — Oliff PLC

(57) ABSTRACT

A simply-supported fixture for a circular plate, including: an opening end cover, circular sleeve, base, and semicircular-ring convex platform. The base has a positioning step for guidance, the circular sleeve is concentrically installed on the step of the base, and the opening end cover is concentrically installed on the circular sleeve and connects to the base through a reaming hole bolt. A circular plate disposed between the opening end cover and base, and opposite sides of the opening end cover and base are provided with concave platforms. Two semicircular-ring convex platforms of the same diameter are concentrically installed on the concave platforms, the reaming hole bolt is tightened with force, and the circular plate is supported and fixed on the fixture. The circular plate and the semicircular-ring convex platform on the opening end cover and base, are in line contact wherein lines are parallel and concentric having the same radius.

10 Claims, 2 Drawing Sheets

SIMPLY-SUPPORTED FIXTURE USED FOR CIRCULAR PLATE IN DYNAMICS OR STATICS EXPERIMENT

BACKGROUND

Technical Field

The present invention relates to a fixture used in a dynamics or statics experiment, and in particular, to a thickness-adjustable simply-supported fixture used for a circular plate in a dynamics or statics experiment.

Related Art

A simply-supported fixture used in a dynamics or statics experiment must make a clamped workpiece meet a simply-supported boundary condition, that is, a deflection w and a bending moment M at a boundary where the workpiece is clamped are zero. The circular plate in polar coordinates must meet the following simply-supported boundary condition:

$$w|_{r=a} = 0, M_r|_{r=a} = 0$$

where a is an effective support radius of the circular plate. Currently, most of simply-supported fixtures are unilateral simply-supported, bilateral simply-supported, trilateral simply-supported, and quadrilateral simply-supported fixtures for a rectangular plate, and the simply-supported fixture for a circular plate is rarely involved.

SUMMARY

To resolve a problem existing in the related art, this application designs a series of simply-supported fixtures for circular plates of a series of standard sizes through a research on a simply-supported boundary condition, so as to provide a series of fixtures meeting the condition for a simply-supported mechanics experiment of a circular plate.

An objective of this application is to provide a simply-supported fixture used for a circular plate in a dynamics or statics experiment, and the technical solution adopted in this application is as follows:

A simply-supported fixture used for a circular plate in a dynamics or statics experiment is configured to clamp the circular plate, and includes an annular end cover, annular convex platforms, a circular sleeve, and an annular base, where the bottom of the annular end cover is provided with a first positioning concave platform, the top of the annular base is provided with a second positioning concave platform, and the first positioning concave platform and the second positioning concave platform correspond vertically; an inner circle of the first positioning concave platform is provided with a first annular convex platform, an inner circle of the second positioning concave platform is provided with a second annular convex platform, and the first annular convex platform and the second annular convex platform correspond vertically and are configured to clamp the circular plate; an outer circle of the annular end cover and an inner circle of the circular sleeve, and an outer circle of the annular base and the inner circle of the circular sleeve, are in a high-precision concentric clearance fit, the annular end cover and the annular base are provided with bolt holes, and the annular end cover is connected to the annular base through a reaming hole bolt.

In a further technical solution, shapes and sizes of the first positioning concave platform and the second positioning concave platform are totally the same, and the two are both in annular structure; and the first positioning concave platform and the second positioning concave platform are processed together.

In a further technical solution, the first annular convex platform is installed on the first positioning concave platform, and the first annular convex platform, the first positioning concave platform, and the outer circle of the annular end cover form a step structure.

In a further technical solution, the second annular convex platform is installed on the second positioning concave platform, and the second annular convex platform, the second positioning concave platform, and the outer circle of the annular base form a step structure.

In a further technical solution, cross sections of the first annular convex platform and the second annular convex platform are semicircular, and sizes of the two are totally the same. Specifically, the convex platforms are two semicircular rings of the same size formed by cutting a complete ring with a circular cross section along a neutral plane of the ring through a cutting technique.

In a further technical solution, the first annular convex platform is connected to the annular end cover through screws, and the second annular convex platform is connected to the annular base through screws.

In a further technical solution, the first annular convex platform on the annular end cover and the circular plate, and the second annular convex platform on the annular base and the circular plate, are both in line contact, and contact arc lines are parallel and concentric and have the same radius.

In a further technical solution, the first annular convex platform and the second annular convex platform clamp an outer ring of the circular plate; and when the circular plate is under a load perpendicular to the neutral plane of the circular plate, a deflection w at a boundary is zero, and a bending moment M at the boundary is zero, so that a simply-supported boundary condition is met.

In a further technical solution, stiffness of the fixture is large enough, an inherent frequency of the fixture is far greater than a frequency of the circular plate, and in this way the coupled distortion of measurement data does not occur.

In a further technical solution, there are a plurality of bolt holes, the plurality of bolt holes are reaming bolt holes, and the bottom of the base is provided with countersunk screw holes coaxial with the reaming bolt holes.

In a further technical solution, the inner circle of the circular sleeve and the outer circle of the annular end cover, and the inner circle of the circular sleeve and the outer circle of the annular base, are installed by a high-precision concentric clearance fit.

In a further technical solution, the positioning concave platforms are provided for positioning the two semicircular rings. The positioning concave platform must be bored by using a boring tool. During the boring, the base, end cover and circular sleeve of the fixture must be assembled first, and the reaming hole bolt must be tightened. A circular hole of the annular end cover is taken as a reference for the tool setting and alignment, and an inner hole boring tool is used to bore simultaneously the positioning concave platforms on the end cover and base.

Further, the first annular convex platform and the second annular convex platform of the same size are concentrically installed on the two positioning concave platforms of the base and the annular end cover respectively, are tightened and fixed by using the screws and are configured to clamp the circular plate. Value of the roughness of surfaces of the semicircular-ring convex platforms is required to be very small, and the surfaces must be lubricated with lubricating oil for precision instruments during operation.

Further, the simply-supported fixture used for a circular plate in a dynamics or statics experiment in this application may clamp circular plates of different thicknesses by screwing a nut, the circular plate is clamped between two semicircular-ring convex platforms, and the circular plate is fixed by tightening the bolt according to the thickness of the circular plate.

Further, the simply-supported fixture used for a circular plate in a dynamics or statics experiment in the present invention enables a contact force between the first annular convex platform and the circular plate and a contact force between the second annular convex platform and the circular plate to be appropriate by adjusting the nut on the bolt, so that the workpiece is pressed without indentations on a surface of the workpiece, so as to avoid turning line contact into small-camber contact.

Further, the simply-supported fixture used for a circular plate in a dynamics or statics experiment may be designed into a preferred series of standard pieces according to different sizes to test circular plates of different diameters according to different fixture sizes.

Because this application adopts the foregoing technical solution, this application has positive effects as follows:

This application resolves a problem of a simply-supported fixture used for a circular plate in a dynamics or statics experiment. An annular end cover and an annular base are connected through a reaming hole bolt and are positioned through a step according to a simply-supported boundary condition. Two semicircular-ring convex platforms are fixed, and contact areas between the convex platforms and the circular plate are lubricated with lubricating oil for precision instruments. The circular plate and the semicircular-ring convex platform on the annular end cover, and the circular plate and the semicircular-ring convex platform on the base, are both in line contact, and contact arc lines are parallel and concentric and have the same radius. After the annular end cover is pressed tightly, a deflection w and a bending moment M of the circular plate are zero. A unique and simple structure and a use of the bolt increase the clamping capability of the fixture.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute any inappropriate limitation on this application.

In the figures: 1-circular plate; 2-annular end cover; 3-circular sleeve; 4-annular base; 5-second annular convex platform; 6-first annular convex platform; 7-first positioning concave platform; 8-second positioning concave platform; 9-reaming hole bolt; and 10-screw.

DETAILED DESCRIPTION

It should be noted that the following detailed descriptions are all exemplary and are intended to provide a further understanding of this application. Unless otherwise specified, all technical and scientific terms used herein have the same meaning as commonly understood by those of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should be further understood that terms "comprise" and/or "include" used in this specification indicate that there are features, steps, operations, devices, assemblies, and/or combinations thereof.

As described in the related art, at present, there are few reports on the fixture to realize the simply-supported condition of the circular plate.

Figure 1:
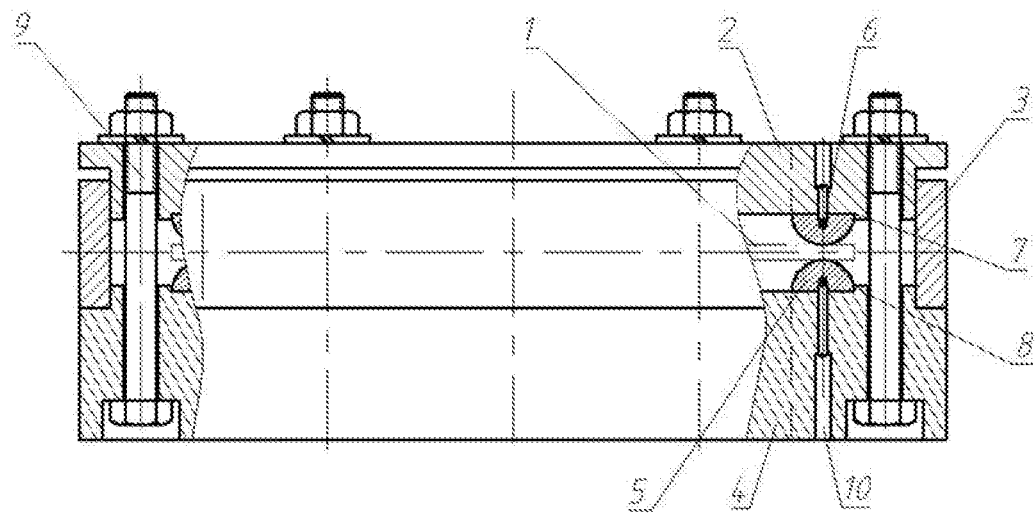
FIG. 1 is a main view of a fixture.
Figure 2:
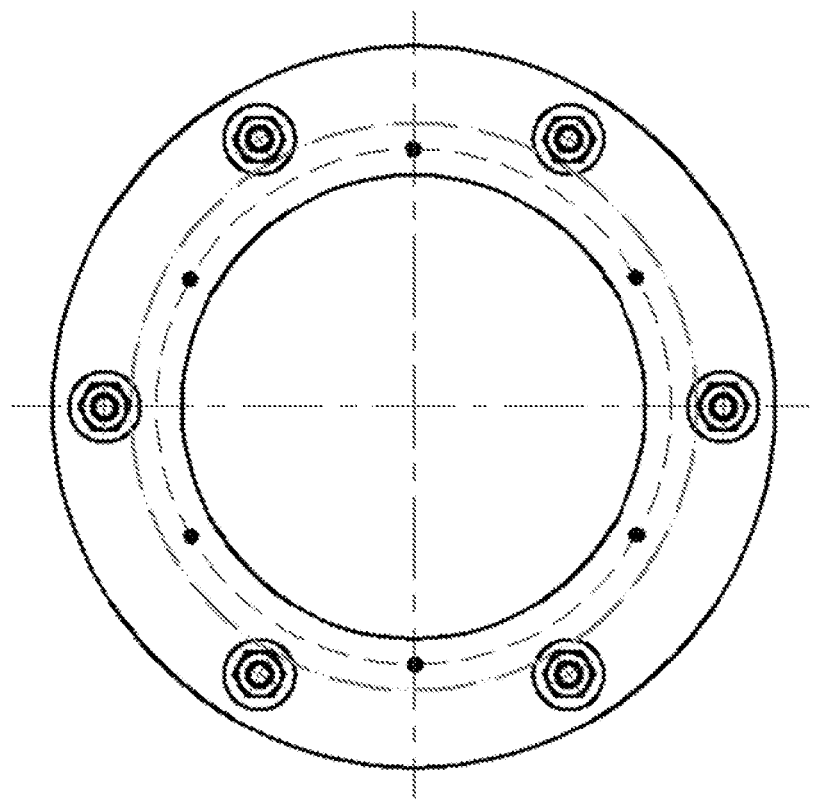
FIG. 2 is a top view of a fixture.
Figure 3:
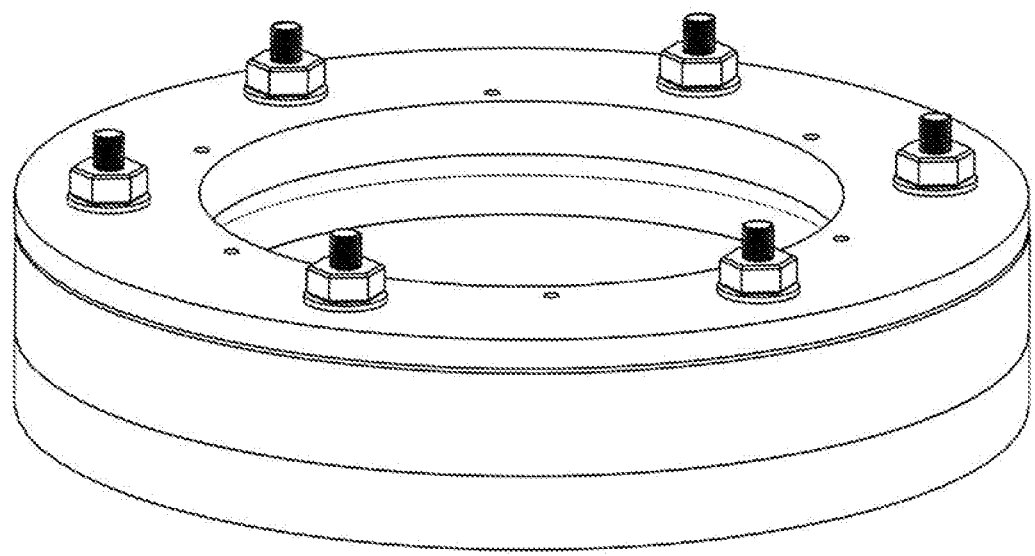
FIG. 3 is a three-dimensional assembly view of a fixture.
Figure 4:
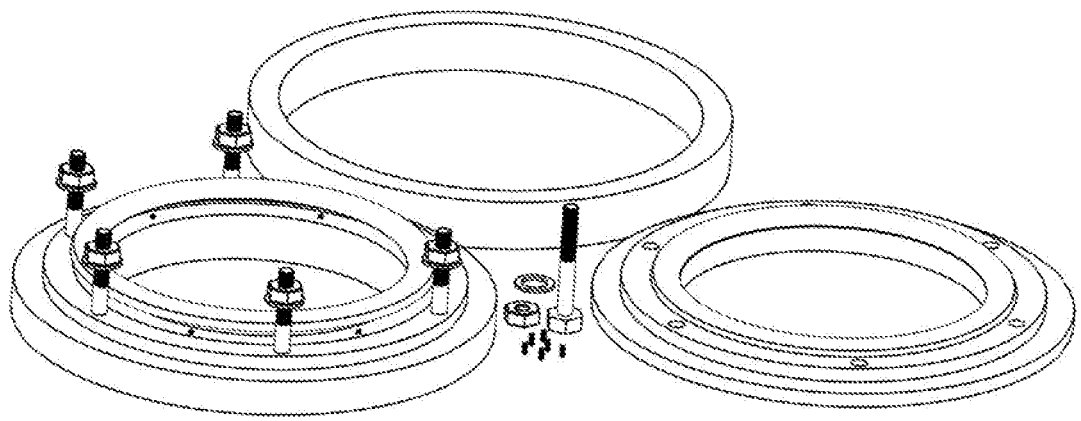
FIG. 4 is an exploded view of a three-dimensional structure of a fixture.

To resolve the foregoing problem, this application is further described below with reference to FIG. 1 to FIG. 4. FIG. 1 is a main view of a fixture, FIG. 2 is a top view of a fixture, FIG. 3 is a three-dimensional assembly view of a fixture, and FIG. 4 is an exploded view of a three-dimensional structure of a fixture.

A simply-supported fixture used for a circular plate in a dynamics or statics experiment is disclosed in this embodiment. Specifically, as shown in FIG. 1, FIG. 2, and FIG. 3, the fixture mainly includes an annular base 4, an annular end cover 2, a circular sleeve 3, a second annular convex platform 5, and a first annular convex platform 6, where the bottom of the annular end cover 2 is provided with a first positioning concave platform 7, the top of the annular base is provided with a second positioning concave platform 8, and the first positioning concave platform 7 and the second positioning concave platform 8 correspond vertically; an inner circle of the first positioning concave platform 7 is provided with the first annular convex platform 6, an inner circle of the second positioning concave platform 8 is provided with the second annular convex platform 5, and the first annular convex platform and the second annular convex platform correspond vertically and are configured to clamp a circular plate 1; an outer circle of the annular end cover and an inner circle of the circular sleeve 3, and an outer circle of the annular base and the inner circle of the circular sleeve 3, are in a high-precision concentric clearance fit. The annular end cover and the annular base are provided with reaming bolt holes, and the annular end cover is connected to the annular base through a reaming hole bolt 9.

Shapes and sizes of the first positioning concave platform 7 and the second positioning concave platform 8 are totally the same, and the two are both in annular structure; and the first positioning concave platform 7 and the second positioning concave platform 8 are processed together.

In a further technical solution, the first annular convex platform 6 is installed on the first positioning concave platform 7, and the first annular convex platform, the first positioning concave platform, and the outer circle of the annular end cover form a step structure.

In a further technical solution, the second annular convex platform 5 is installed on the second positioning concave platform 8, and the second annular convex platform, the second positioning concave platform, and the outer circle of the annular base form a step structure.

The outer circle of the annular end cover and the inner circle of the circular sleeve 3, and the outer circle of the annular base and the inner circle of the circular sleeve 3, are in a high-precision concentric clearance fit. The annular end cover 2 and the annular base 4 are provided with reaming bolt holes, and the annular end cover is connected to the annular base through the reaming hole bolt 9.

In this embodiment, the annular base 4 and the annular end cover 2 are both designed to be provided with positioning steps, there are a plurality of bolt holes evenly distributed in a circumference direction, and the bolt holes are reaming bolt holes. The reaming hole bolt 9 is installed into the reaming bolt hole, and the bottom of the base is provided with countersunk screw hole coaxial with the reaming bolt hole.

In this embodiment, the circular sleeve 3 is concentrically installed on the outer circle of the annular base 4. The outer circle of the annular end cover 2 and the inner circle of the circular sleeve 3, and the outer circle of the annular base 4 and the inner circle of the circular sleeve 3, are installed by a high-precision concentric clearance fit.

In this embodiment, opposite sides of the annular base 4 and the annular end cover 2 are provided with positioning concave platforms configured to position and install the first annular convex platform 6 and the second annular convex platform 5, and the first annular convex platform 6 and the second annular convex platform 5 clamp the circular plate 1.

In this embodiment, the circular plate 1 and the first annular convex platform 6 on the annular end cover 2, and the circular plate 1 and the second annular convex platform 5 on the annular base 4, are both in line contact, and contact arc lines are parallel and concentric and have the same radius.

In this embodiment, the first annular convex platform 6 and the second annular convex platform 5 are two semicircular rings of the same size formed by cutting a complete ring with a circular cross section along a neutral plane of the ring through a cutting technique. Plane sides of the first annular convex platform 6 and the second annular convex platform 5 are provided with threaded holes, and the first annular convex platform 6 and the second annular convex platform 5 are fixed on the annular base and the annular end cover by using screws 10. Value of the roughness of side surfaces of the semicircular rings is required to be very small, and the surfaces must be lubricated with lubricating oil for precision instruments during operation.

A simply-supported fixture used for a circular plate in a dynamics or statics experiment is provided in this application. FIG. 1 is a main view of assembly of a fixture, FIG. 2 is a top view of assembly of a fixture, FIG. 3 is a three-dimensional assembly view of a fixture, and FIG. 4 is an exploded view of a three-dimensional structure of a fixture. This application designs an annular end cover 2 and an annular base 4, which are provided with annular concave platforms configured to position a semicircular-ring convex platform 5 and a semicircular-ring convex platform 6, as shown in FIG. 1 and FIG. 4, so as to ensure that a circular plate 1 and the semicircular-ring convex platform 5 of the fixture, and the circular plate 1 and the semicircular-ring convex platform 6 of the fixture, are in line contact, and contact arc lines are parallel and concentric and have the same radius. After a reaming hole bolt 9 is tightened, a deflection w and a bending moment M around the clamped circular plate are zero, so as to realize a simply-supported boundary condition of the circular plate.

In an implementation of this application, the simply-supported fixture for the circular plate includes an annular end cover 2, a circular sleeve 3, an annular base 4, a semicircular-ring convex platform 5, and a semicircular-ring convex platform 6, which are assembled into structures as shown in FIG. 1 and FIG. 4, and are connected through a reaming hole bolt 9 and assembled into a whole, that is, the simply-supported fixture for the circular plate. The base 4 has a plurality of countersunk screw holes circumferentially and evenly distributed, and a side of the base is designed to be provided with an outer circle step, which is used for positioning and guidance when assembling the circular sleeve 3. The circular sleeve is concentrically installed on the outer circle step of the base, and an outer circle of the annular end cover and an inner circle of the circular sleeve, and an outer circle of the annular base and the inner circle of the circular sleeve, are installed by a high-precision concentric clearance fit. Locations on the annular end cover 2 corresponding to the base have a plurality of reaming bolt holes circumferentially and evenly distributed, and the base 4 is connected to the annular end cover 2 through a reaming hole bolt 9, and a spring washer is used to prevent looseness; opposite sides of the base 4 and the annular end cover 2 are both designed to be provided with positioning concave platforms of the same size, which are configured to position and assemble the two semicircular-ring convex platforms. A positioning step 7 and a positioning step 8 must be bored by using a boring tool; and during the boring, the base 4, annular end cover 2, and circular sleeve 3 of the fixture must be assembled first, the bolts must be tightened, then a circular hole of the annular end cover is taken as a reference for the tool setting and alignment, and an inner hole boring tool is used to bore simultaneously the positioning step 7 and the positioning step 8 on the end cover and the base. The foregoing semicircular-ring convex platforms are two semicircular rings of the same size formed by cutting a complete ring with a circular cross section along a neutral plane of the ring through a cutting technique. The two semicircular-ring convex platforms of the same size are concentrically installed on the positioning step 7 and the positioning step 8, and there are a plurality of screws 10 distributed in a circumference direction to fix the semicircular-ring convex platforms. Value of the roughness of surfaces of the semicircular-ring convex platforms is required to be very small, and the surfaces must be lubricated with lubricating oil for precision instruments during operation. The semicircular-ring convex platforms are configured to clamp the circular plate. A height of the end cover may be changed by screwing the nut, so as to measure circular plates of different thicknesses. During measurement, the lubricating oil is used for contact surfaces between the circular plate and the fixture, and the contact force is appropriate, so that the workpiece is pressed without indentations on a surface of the workpiece, so as to avoid turning line contact into small-camber contact. The semicircular-ring convex platform connected to the annular end cover and the semicircular-ring convex platform connected to the base ensure that contact between the circular plate and the fixture is line contact. After the annular end cover is pressed tightly, a deflection w and a bending moment M of the circular plate are restricted to zero. A unique structure design and a use of the bolt increase the clamping capability of the fixture, so that a simply-supported boundary condition of the circular plate is met. According to the design of this solution, a simply-supported test on a circular plate is implemented, and the problem of the simply-supported test fixture for the circular plate is resolved.

Further, the simply-supported fixture for the circular plate may be designed into a preferred series of standard pieces according to different sizes to test circular plates of different diameters according to different fixture sizes.

Further, the stiffness of the simply-supported fixture used for a circular plate in a dynamics or statics experiment is large enough, an inherent frequency thereof is far greater than a frequency of the circular plate, and in this way the coupled distortion of measurement data does not occur.

The foregoing descriptions are merely exemplary embodiments of this application but are not intended to limit this application. This application may include various modifications and changes for a person skilled in the art. Any modification, equivalent replacement, or improvement made without departing from the spirit and principle of this application shall fall within the protection scope of this application.

What is claimed is:

1. A simply-supported fixture used for a circular plate in a dynamics or statics experiment, configured to clamp a circular plate, comprising an annular end cover, a circular sleeve, and an annular base;
   a bottom of the annular end cover is provided with a first positioning concave platform, a top of the annular base is provided with a second positioning concave platform, and the first positioning concave platform and the second positioning concave platform correspond vertically; an inner circle of the first positioning concave platform is provided with a first annular convex platform, an inner circle of the second positioning concave platform is provided with a second annular convex platform, and the first annular convex platform and the second annular convex platform correspond vertically and are configured to clamp the circular plate; an outer circle of the annular end cover and an inner circle of the circular sleeve, and an outer circle of the annular base and the inner circle of the circular sleeve, are installed in a concentric clearance fit, and the annular end cover is connected to the annular base through a connecting piece.

2. The simply-supported fixture used for a circular plate in a dynamics or statics experiment according to claim 1, wherein shapes and sizes of the first positioning concave platform and the second positioning concave platform are totally the same, and the two are both in annular structure; and the first positioning concave platform and the second positioning concave platform are processed together.

3. The simply-supported fixture used for a circular plate in a dynamics or statics experiment according to claim 1, wherein the first annular convex platform, the first positioning concave platform, and the outer circle of the annular end cover form a step structure.

4. The simply-supported fixture used for a circular plate in a dynamics or statics experiment according to claim 1, wherein the second annular convex platform, the second positioning concave platform, and the outer circle of the annular base form a step structure.

5. The simply-supported fixture used for a circular plate in a dynamics or statics experiment according to claim 1, wherein cross sections of the first annular convex platform and the second annular convex platform are semicircular, and sizes of the two are totally the same.

6. The simply-supported fixture used for a circular plate in a dynamics or statics experiment according to claim 1, wherein the first annular convex platform is connected to the annular end cover through screws, and the second annular convex platform is connected to the annular base through screws.

7. The simply-supported fixture used for a circular plate in a dynamics or statics experiment according to claim 1, wherein the first annular convex platform on the annular end cover and the circular plate, and the second annular convex platform on the annular base and the circular plate, are both in line contact, and contact arc lines are parallel and concentric and have the same radius.

8. The simply-supported fixture used for a circular plate in a dynamics or statics experiment according to claim 1, wherein the first annular convex platform and the second annular convex platform clamp an outer ring of the circular plate; and when the circular plate is under a load perpendicular to neutral plane of the circular plate, a deflection w at a boundary is zero, and a bending moment M at the boundary is zero, so that a simply-supported boundary condition is met.

9. The simply-supported fixture used for a circular plate in a dynamics or statics experiment according to claim 1, wherein the simply-supported fixture used for a circular plate in a dynamics or statics experiment is designed into a preferred series of standard pieces according to different sizes to test circular plates of different diameters according to different fixture sizes.

10. The simply-supported fixture used for a circular plate in a dynamics or statics experiment according to claim 1, wherein an inherent frequency of the fixture is far greater than a frequency of the circular plate.

* * * * *